March 20, 1945.  W. A. LIPPINCOTT  2,371,632

ACCUMULATOR

Filed Jan. 1, 1943

INVENTOR
Wells A. Lippincott
By Parker, Carlson, Pitzner & Hubbard
ATTORNEYS

Patented Mar. 20, 1945

2,371,632

UNITED STATES PATENT OFFICE 2,371,632

ACCUMULATOR

Wells A. Lippincott, Evanston, Ill., assignor to Ideal Roller & Manufacturing Company, Chicago, Ill., a corporation of Illinois Application January 1, 1943, Serial No. 470,995

9 Claims. (Cl. 138—30)

This invention relates to hydraulic accumulators of the type in which the outer peripheral edge of a flexible separator or diaphragm is clamped between opposed flanges on two parts of a rigid container or tank.

The general object is to reduce the possibility of breakage of the separator in service use particularly at extremely low temperatures by preventing sharp bending of the diaphragm adjacent the clamped area thereof.

Another object is to provide a novel ring construction held between the container flanges and defining a minimum radius of bending of the diaphragm.

Figure 1:
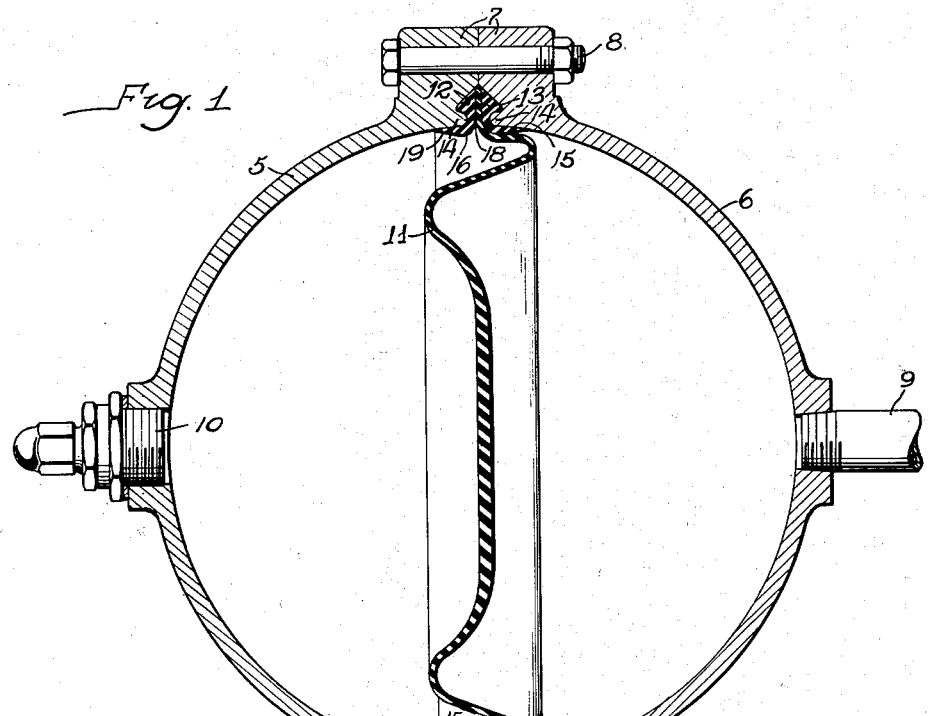

Other objects and advantages of the invention will become apparent from the following detailed description taken in connection with the accompanying drawing, in which Figure 1 is a longitudinal sectional view of an accumulator embodying the present invention.

Figures 2, 4:
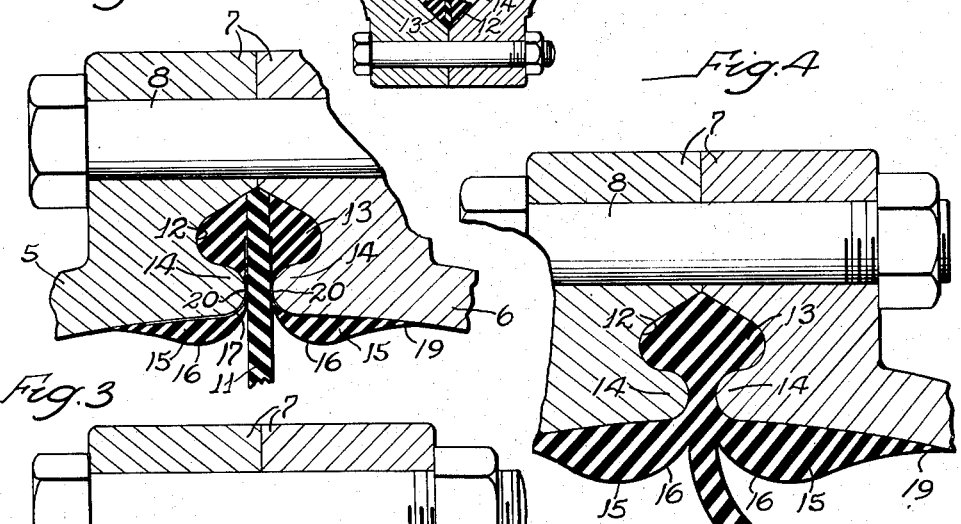
Figure 3:
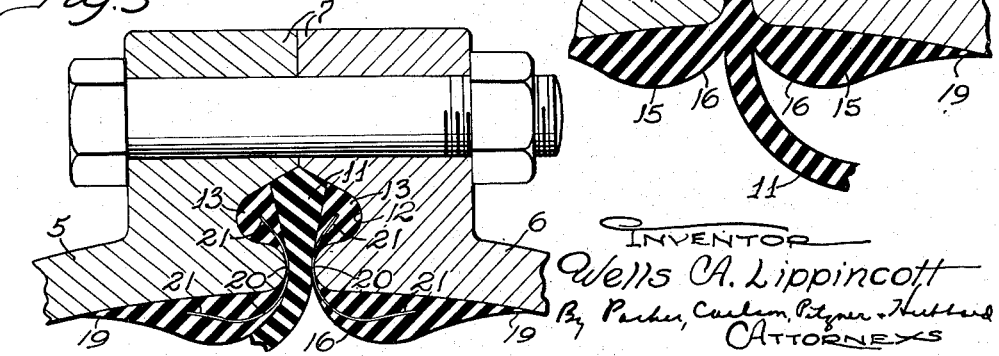

Figs. 2, 3, and 4 are enlarged fragmentary views of modified constructions.

While the invention is applicable to various forms of accumulator tanks, it is shown in the drawing, for purposes of illustration incorporated in an accumulator having a rigid spherical container or tank comprising two hemispherical parts or cups 5 and 6 having external flanges 7 at their open ends clamped together by bolts 8. The tank has the usual oil inlet and outlet 9 at one end, and a valve controlled air inlet 10 at the other end.

The oil and air are confined in separate bodies within the tank by a flexible diaphragm or separator 11 preferably molded of oil resisting material such as a synthetic rubber and formed with concentric folds somewhat as shown in Fig. 1 or of any other desired shape. To hold the diaphragm in place, its outer margin is clamped between the flanges 7, grooves 12 of generally V-shape being provided in the opposed faces of the flanges to receive annular ribs or enlargements 13 integral with or fastened to the diaphragm and extending around the periphery of the latter on both sides thereof. With the diaphragm thus supported within the tank, it is free to move axially of the tank and come into partial or full contact with the interior of either cup 5 or 6 depending on the amount of oil with which the accumulator is charged.

In service, particularly in operation at low temperatures, diaphragms of the above character have failed at or adjacent the lips 14 of the cups around which the periphery of the diaphragm bends as the diaphragm moves back and forth within the tank. The present invention aims to minimize the possibility of such failure by increasing substantially the minimum radius at which the diaphragm may be bent adjacent the clamped area. For this purpose, the lips 14 which are usually rounded at a small radius are covered by rings 15 preferably of molded material such as synthetic rubber and lying against the inner walls of the cups adjacent the open ends thereof and having convex surfaces 16 of substantially greater radius than the cup ends 17, such radius being on the order of $\frac{3}{32}$ of an inch. The surface 16 of each ring extends over an arc of about 180 degrees from a point 18 of tangency with the clamped area of the diaphragm. The other side of each ring beyond the convex surface 16 tapers to a feather edge 19 which merges with the inner wall of the cup.

The rings 15 may be held in place in a variety of ways preferably by connections with the ribs 13 so as to be held in place against the cup lips by the diaphragm clamp. In the form shown in Fig. 1, each ring 15 is molded integrally with one of the ribs 13, one side of which is seated in the groove 12, and the other side of which is substantially flat and cemented to the diaphragm. In this case, the cup lips 14 are spaced apart sufficiently to permit the connection 20 between the ring 15 and the rib 13 to be of proper thickness since it is composed preferably of rubber material. With the ribs 13 clamped against the diaphragm and between the flanges 7, it will be apparent that the rings 15 will be held in proper position against the inner cup walls, and in these positions, the surfaces 16 define minimum radii for bending of the diaphragm margins.

In tank constructions where the cup lips 14 are spaced apart approximately the thickness of the diaphragm, an arrangement such as that shown in Figs. 2 and 3 is preferred, the connections 20 between the ribs and the rings then comprising a ring of thin sheet metal curved in cross section to fit around the lips 14. The metal ring may be bonded to the flat side of the rib 13 and to the outer surface of the ring 15 as shown in Fig. 2. Preferably the metal extends only partially across the rib 13 so as to leave an area which may be cemented to the diaphragm. A preferable way of securing the ribs and rings to the metal rings is to perforate the edge portions 21 of the latter and embed these portions in the ribs and rings as shown in Fig. 3, each ring and rib formed in one molding operation. If desired, the outer edge of the diaphragm may be wedge-shaped as shown in Fig. 3 so as to be held more firmly between the ribs 13 when the latter are clamped together.

In the construction shown in Figs. 1 to 3, the ribs 13 and the rings 15 are preferably made of somewhat harder and tougher rubber material than the diaphragm 11. Such constructions are better able to withstand the substantial pressure required under certain operating conditions and to effect better distributed application of the clamping force to the diaphragm area contacted by the ribs.

The rings 15, as well as the ribs 13, may be molded integral with the diaphragm as shown in Fig. 4. In this case the points of mergence of the diaphragm faces with the surfaces 16 are spaced inwardly somewhat from the inner walls of the cup to provide an ample thickness of rubber between the lips 14.

I claim as my invention:

1. An accumulator having, in combination, two cups having abutting external flanges at their open ends and opposed grooves in the abutting surfaces, a diaphragm having ribs around its periphery clamped in said grooves, and rings connected to said ribs and extending around the ends of said cups so as to be held against the interior thereof by the diaphragm clamp, said rings having convex surfaces defining bending radii which are substantially greater than the radii of the cup ends.

2. An accumulator having, in combination, a diaphragm, a tank comprising two cups abutting each other at their open ends and clamping the periphery of the diaphragm between them, sheet metal rings hooked around the lips of said cups and clamped between said lips and said diaphragm, and rings of molded material secured to the inner edges of said metal rings and lying against the inner walls of said cups adjacent said lips, said molded rings having convex surfaces facing inwardly and defining increased radii around which that portion of said diaphragm adjacent the clamped area thereof may bend in one direction or the other.

3. An accumulator having, in combination, a diaphragm having ribs around each side of its periphery, a tank comprising a pair of cups with their open ends clamped against said ribs to support the diaphragm within the tank, and rings extending around the interior of the cup lips and defining minimum radii of bending of the diaphragm adjacent the clamped area thereof, said rings being molded integral with said ribs.

4. An accumulator having, in combination, a diaphragm having ribs around each side of its periphery, a tank comprising a pair of cups with their open ends clamped against said ribs to support the diaphragm within the tank, rings of molded material lying against the inner walls of said cups adjacent the lips thereof and defining increased radii of bending of the diaphragm, and sheet metal rings clamped between said cup lips and said diaphragm and having opposite edge portions fastened to said ribs and rings respectively.

5. An accumulator having, in combination, a diaphragm having ribs around each side of its periphery, a tank comprising a pair of cups with their open ends clamped against said ribs to support the diaphragm within the tank, rings of molded material lying against the inner walls of said cups adjacent the lips thereof and defining increased radii of bending of the diaphragm, and sheet metal rings clamped between said cup lips and said diaphragm and having opposite edge portions perforated and embedded in said rings and ribs respectively.

6. For use in an accumulator, a flexible diaphragm of molded material having axially facing ribs around each side of its periphery, and rings connected to and spaced inwardly from said ribs and projecting axially away from said diaphragm, the inwardly facing surfaces of said rings being of convex contour and defining radii around which that portion of the diaphragm adjacent said rings may bend in one direction or the other.

7. For use in an accumulator, a flexible diaphragm of molded material having ribs around each side of its periphery, and rings connected to and spaced inwardly from said ribs and projecting away from said diaphragm and defining radii of bending for the diaphragm, said diaphragm, said ribs and said rings being molded as one integral piece.

8. For use in an accumulator, a flexible diaphragm of molded material having ribs around each side of its periphery, rings spaced inwardly from said ribs and projecting in opposite directions away from said diaphragm along the inner walls of the cups, and sheet metal rings connecting said ribs and said first mentioned rings.

9. For use in an accumulator, a flexible diaphragm having peripheral ribs extending around opposite sides of the diaphragm and projecting axially in opposite directions, and flanges spaced inwardly from and concentric with the respective ribs and having convex interal surfaces merging into coincidence with opposite sides of said diaphragm.

WELLS A. LIPPINCOTT.